United States Patent [19]

Endo et al.

[11] Patent Number: 5,096,644
[45] Date of Patent: Mar. 17, 1992

[54] PROCESS FOR MAKING A FILLED METATHESIS POLYMER ARTICLE

[75] Inventors: Zenichiro Endo; Shigeyoshi Hara, both of Iwakuni, Japan; Paul A. Silver, Wilmington, Del.; Hikoichiro Yamada, Iwakuni, Japan

[73] Assignee: Hercules Incorporated, Wilmington, Del.

[21] Appl. No.: 370,532

[22] Filed: Jun. 23, 1989

[30] Foreign Application Priority Data

Jun. 27, 1988 [JP] Japan .................. 63-15728

[51] Int. Cl.$^5$ .................. B29C 45/14; B29C 45/16; B32B 31/00
[52] U.S. Cl. .................. 264/137; 264/257; 264/328.6; 264/328.18; 264/331.13; 524/445; 524/449; 524/451; 524/553; 524/554; 526/283; 528/27; 528/32

[58] Field of Search .................. 264/41, 135, 137, 257, 264/328.6, 328.17, 328.18, 331.13, 331.12; 156/329; 427/215, 387; 524/445, 449, 451, 553, 554, 847; 526/169, 172, 281, 283; 528/19, 27, 32, 33, 34

[56] References Cited

U.S. PATENT DOCUMENTS

| | | | |
|---|---|---|---|
| 4,526,922 | 7/1985 | Pickwell et al. | 524/445 |
| 4,598,102 | 7/1986 | Leach | 264/328.6 X |
| 4,918,138 | 4/1990 | Hara et al. | 526/283 X |
| 4,923,943 | 5/1990 | Hara et al. | 526/283 |

FOREIGN PATENT DOCUMENTS 1389267  4/1975  United Kingdom ............. 264/137

*Primary Examiner*—Leo B. Tentoni
*Attorney, Agent, or Firm*—Joanne W. Patterson; William S. Alexander

[57] ABSTRACT

A molded article is produced by metathesis polymerization of a mixture containing at least one metathesis polymerizable monomer, a metathesis polymerization catalyst and an organic or inorganic filler material which has been treated with a vinyl-substituted silane coupler having at least one hydrolyzable group in addition to the vinyl group.

5 Claims, No Drawings

PROCESS FOR MAKING A FILLED METATHESIS POLYMER ARTICLE

FIELD OF THE INVENTION

This invention relates to a molded article of a metathesis polymerized polymer containing fillers and a process for producing the molded article.

BACKGROUND OF THE INVENTION

U.S. Pat. No. 4,400,340 and U.S. Pat. No. 4,426,502 disclose the production of a molded article by injecting two kinds of reactive solutions, one of which comprises a norbornene-type monomer such as dicyclopentadiene and the catalyst component of a metathesis polymerization catalyst system and the other comprises a norbornene-type monomer and the activator component of the catalyst system using impingement mixing into a mold in which said liquid mixture is metathesis polymerized in bulk (called "RIM process" hereinafter). RIM process is a low pressure one-step or one-shot injection process and the liquid mixture injected into the mold polymerizes rapidly to form a molded article. Thus, there are easily and cheaply produced large-sized molded articles from norbornene-type monomers such as dicyclopentadiene by RIM process.

U.S. Pat. No. 4,598,102 discloses the addition of reinforcing agents or fillers such as glass, wollastonite, mica, carbon black, talc and calcium carbonate into the metathesis polymerizable composition of cyclic olefin monomers.

Although such reinforcements are added to improve mechanical and physical properties, such as flexural modulus and strength, it has been observed that the addition of them does not necessarily achieve such improvement effectively. It is known that affinity between reinforcements and matrix polymers influences mechanical and physical properties of the composites thereof and that good affinity generally improves those properties.

There are many references in the prior art to increasing the affinity between the reinforcements and the matrix polymers. One of the methods commonly used is the treatment of the reinforcements or the fillers with a coupling agent. Among coupling agents, there have been used most commonly silane coupling agents, having at least one group, which is hydrolyzable to silanol group and is bonded to silicon atom, and at least one group which imparts good affinity to the matrix polymers.

The silanol group may readily react with hydroxyl groups or other active groups existing on the surface of the reinforcements.

Thus, the silane couplers can act as a go-between of the matrix and the reinforcements.

As a matter of course, the groups which impart the good affinity to the matrix polymers should differ depending on the kinds of the polymers.

It has been found that vinylsilanes, for example, which were used previously as couplers for unsaturated polyesters (UPE), are not so effective. Methacryl silanes, therefore, are now used predominantly as couplers for UPE instead of vinylsilane.

Aminoalkyl silane couplers and epoxy-containing silane couplers are used for epoxy resins, polyurethanes, polyamides, polyimides, phenolic resins and the like. Chloroalkylsilanes and mercapto-group-containing silane couplers are suitably used with such rubbers as EPDM, SBR, NR and polychloroprenes.

Silane couplers which impart good affinity to the above mentioned metathesis-polymerized polymers with fillers have been required to prepare composites having good properties.

So far as we are aware of, there was available no prior information on silane couplers imparting such good affinity to the metathesis polymerized polymers.

We have studied and tested the coupling effect of many silanes as to whether the silanes can increase the affinity of the metathesis polymerized polymers with the fillers and reinforcing materials or not. The tests of the coupling properties were carried out, for example, by measuring the bonding strength between the metathesis polymerized polymers and a glass plate pretreated with one of the silanes.

As a result, we have found that, among many silanes, particular silanes having at least one hydrolyzable group bonded to silicon atom and at least one unsaturated group of the formula $R^1$—CH=CH—$R^2$—, wherein $R^1$ is hydrogen or alkyl group of 1-6 carbon atoms, and $R^2$ is a single bond or alkylene group of 1-6 carbon atoms, which is bonded to silicon atom, having very excellent coupling properties and increases magnificently the affinity of the metathesis polymerized polymers with the fillers and reinforcing materials to reinforce largely the polymers. The selective and excellent coupling properties of these silanes for the metathesis polymerized polymers are beyond expectation, since these silanes have been seldom used recently to treat the reinforcements for the usual polymers such as UPE, epoxy resins, polyurethane, phenol resins, polyamide and the like.

Further, it is an unexpected finding that said particular silanes do not substantially damage the activity of the metathesis polymerization catalyst system, when used in the metathesis polymer systems.

Therefore, it is an object of the present invention to provide a molded article which is reinforced by fillers pretreated with said particular silanes.

A further object of the present invention is the provision of a process for producing the reinforced molded articles containing the fillers.

SUMMARY OF THE INVENTION

The present invention relates to a molded article produced by metathesis polymerizing in a mold a composition comprising at least one of metathesis polymerizable monomers and a metathesis polymerization catalyst system in the presence of at least one of filler, characterized in that the filler is treated by a silane coupler having at least one hydrolyzable group bonded to silicon atom and at least one group of the formula $R^1$—CH=CH—$R^2$—, wherein $R^1$ is a hydrogen or alkyl group of 1-6 carbon atoms; and $R^2$ is a single bond or alkylene group of 1-6 carbon atoms, which is bonded to silicon atom.

DETAILED DESCRIPTION OF THE INVENTION

In the present invention, the silanes used to treat the fillers have at least one hydrolyzable group bonded to silicon atom and at least one group of the formula $R^1$—CH=CH—$R^2$—, wherein $R^1$ and $R^2$ represent the same groups as mentioned above respectively, which is bonded to silicon atom.

The silanes are preferably of the formula $$R^1-CH=CH-R^2-Si(R^3)_m(X)_{3-m} \qquad (I)$$

wherein $R^1$ and $R^2$ are the same as defined above, $R^3$ is alkyl-group of 1-6 carbon atoms, X is a hydrolyzable group selected from the group consisting of halogen, alkoxy and acyloxy group optionally having other polar group, and m is 0, 1 or 2.

From the view point of affinity with the fillers, silanes of the formula $$R^1-CH=CH-R^2-Si(X)_3 \qquad (II)$$

wherein $R^1$, $R^2$ and X are the same groups as mentioned above, respectively, are more preferable.

The group $R^1$ in the silanes of the formulas (I) and (II) mentioned above is hydrogen, methyl, ethyl, straight or branched propyl, butyl, pentyl or hexyl. Among them, hydrogen or methyl, especially hydrogen, is preferable.

The group $R^2$ in silanes of the formulas (I) and (II) above is a single bond, methylene, straight or branched ethylene, propylene, butylene, pentylene or hexylene. Among them, the single bond or methylene is suitable.

$R^3$ in silanes of the formula (I) is methyl, ethyl, straight or branched propyl, butyl, pentyl or hexyl, preferably methyl.

When m is 0 or 1 in formula (I), silanes have two or three hydrolyzable group X, which may be the same or different. The group X can hydrolyze to hydroxyl group which reacts with polar groups on the surface of the fillers. The group X represents alkoxy containing or not containing other polar group, such as methoxy, ethoxy, propoxy or methoxyethoxy; acyloxy such as acetoxy, propionyloxy or butyroyloxy; or halogen such as chloride, fluoride, bromide or iodide. The hydrolyzability of the group X increases in the order of chloride, acetoxy, methoxy and ethoxy in general.

Examples of preferable silanes used in the present invention include vinyltrimethoxysilane, vinyldimethoxychlorosilane, vinylmethoxydichlorosilane, vinyltrichlorosilane, vinyltriethoxysilane, vinyldiethoxychlorosilane, vinylethoxydichlorosilane, allyltrimethoxysilane, allyldimethoxychlorosilane, allyltrichlorosilane, allyltriethoxysilane, allyldiethoxychlorosilane, allylethoxydichlorosilane, vinyltriacetoxysilane, vinyldiacetoxychlorosilane, vinylacetoxydichlorosilane, allyltriacetoxysilane, allyldiacetoxychlorosilane, allylacetoxydichlorosilane, vinyltris(methoxyethoxy)silane, allyltris(methoxyethoxy)silane, vinylmethyldimethoxysilane, allylmethyldimethoxysilane, vinylmethyldiethoxysilane, allylmethyldiethoxysilane, vinylmethyldiacetoxysilane, allylmethyldiacetoxysilane, vinylmethyldichlorosilane, allylmethydichlorosilane, vinyldimethylmethoxysilane, allyldimethylmethoxysilane, vinyldimethylethoxysilane, allyldimethylethoxysilane, vinyldimethylacetoxysilane, allyldimethylacetoxysilane, vinyldimethylchlorosilane, allyldimethylchlorosilane, 2-butenyltrimethoxysilane, 2-butenyltriethoxysilane, 2-butenyltriacetoxysilane, 2-butenyltrichlorosilane and the like. Among them, vinyltriethoxysilane, vinyltris(methoxyethyl)silane, allyltriethoxysilane, allyltrimethoxysilane, 2-butenyl-triethoxysilane, 2-butenyltrimethoxysilane are more preferable for high coupling properties, easy workability, easy availability, low cost, and the like.

It is desirable that the fillers have active groups such as hydroxyl groups on their surface to react with the silanol group generated by hydration.

In the present invention, there may be used various inorganic or organic fillers, especially inorganic fillers, in the form of fiber, fabric, fiber mat, fiber preform, powder, particle, flake, microballoon, and the like.

Examples of the inorganic fillers include synthetic and natural materials such as glass, alumina, silica, potassium titanates or other titanates, aluminum silicate or other silicates, wollastonite, mica, kaolin, clay, talc, and the like. Also, some organic materials having active hydrogen, such as cellulose, polyamides, phenol resins, and the like, can be exemplified as the suitable fillers to be used for the above metathesis-polymerized systems by being treated with the above silanes.

Among many fillers, glass fillers are preferable. Any form of glass fillers may be used in the present invention. Examples of glass fillers include woven, nonwoven, and knitted glass cloth made of glass filaments, glass fiber mat and glass fiber preform made by binding chopped glass strands or glass filaments with a binder or by needle punching the glass filaments, chopped glass fiber and strand, glass microfiber, glass powder, glass particle, glass flake, glass microballoon, and the like.

In the present invention, the fillers are treated with the particular silanes mentioned above. The treatment of the fillers with the silanes may be carried out according to any known process, for example, by applying a solution of the silane to the fillers, then drying and heating the fillers. As the solvent for the silane solution, there is used water, an organic polar solvent such as an alcohol, acetone, ether, ester, or a mixture thereof. In view of low cost and safety, water is preferable. In usual, about 0.5 to about 2% of solutions of the silanes are preferably used for the treatment of the fillers.

During the drying and heating of the fillers treated with the silanes, the hydrolyzable group of the silanes hydrolyzes to a hydroxyl group to react with active groups, such as hydroxyl, which exist on the surface of the fillers, and the silanes are bonded to the fillers. The drying and heating processes may be carried out suitably depending on the kinds of the silanes, fillers, solvent, and the like. In the case of glass fiber treated with an aqueous solution of vinyltriethoxysilane, for example, the pretreated glass fiber is dried at a temperature of about 15 to about 30° C. for about 6 to 24 hours and then heated at a temperature about 100 to about 140° C. for about 5 to 20 minutes.

In the case of the fiber-based fillers or reinforcements, the silane couplers can conveniently be applied to the fibers as components of spinning finishing oil when the fibers are spun.

In the present invention, the treatment of the fillers with the silane is preferably carried out prior to the contact of the fillers with the metathesis polymerizable composition, since in-situ treatment of the fillers with the silanes in the metathesis polymerizable composition usually necessitate more amount of the silanes to result in coupling effect of the silanes, leading to the decrease of the activity of the metathesis polymerization catalyst system and the production of molded articles with undesirable surface characteristics, such as poor paint adhesion caused by silane residues.

The amount of the silanes to be applied to the fillers may be varied suitably depending on the kind of the fillers and the silanes, composition of the solvents used to treat the fillers and other factors.

For example, when the fillers are glass fiber, about 0.3 to about 3 g of the silane per 100 g of the fillers are applied to the fillers.

The pretreated fillers in the form of a small sized powder, flake, microfiber, particle or microballoon are usually added into the metathesis polymerizable composition before introducing the composition into a mold. The metathesis polymerizable composition containing the fillers are introduced into the mold and metathesis polymerized there to produce a molded article. In this case, it is desirable to pay attention to the uniform dispersion of the fillers in the composition so that the nozzle of the injection machine and the inlet of the mold are not blocked by the fillers.

When the fillers are fabric such as woven, nonwoven or knitted cloth, fiber mat, fiber preform, large or long sized fiber, particle or flake, they are usually put in a mold before the metathesis polymerizable composition is introduced into the mold. In this case, it is desirable to remove air contained in the filler in order to impregnate fully the polymerizable composition into the spaces between the fillers and in order to produce a molded article with no or less void. The removal of air from the filler may be carried out prior to and/or simultaneously with application of vacuum to the mold, into which metathesis polymerizable composition is introduced.

The use of such filler as fabric, fiber mat, fiber preform, large or long sized fiber, flake and the like generally provides molded articles with more increased rigidity, dimensional stability, heat-distortion temperature and mechanical strengths such as flexural modulus, flexural strength, tensile strength, impact strength and the like than the use of small sized fillers such as powder, microfiber and the like, though the use of large or long sized fillers such as fabric makes the molding process somewhat complicated and requires a rather longer molding cycle time.

The amount of fillers can be suitably varied depending on the kind of the fillers, the size and shape of the molded articles, the properties required for the molded articles and the like. In general, the fillers are used in the amount of about 3 to 50%, preferably about 5 to 40%, based on the volume of the molded articles. The strength of the molded articles generally increases as the amount of the fillers increases. The use of too much filler, however, undesirably makes the impregnation of the metathesis polymerizable composition into spaces of the mold difficult and produces the molded articles having many voids or defects.

Usually it is preferable that the fillers are dispersed or placed uniformly in the molded articles. But, in some cases, the fillers may be dispersed or placed uniformly in the molded articles according to the intended application. For example, the fillers may be placed only in a particular part of the molded articles required to be more strong. The fillers can be placed in one or both surfaces alone of the molded articles or in the intermediate part alone of the molded articles. The molded articles may comprise two or more kinds of the fillers.

For example, a woven glass cloth made of fine denier glass filaments or a paper may be placed in circumference of the molded article and a nonwoven glass fiber mat prepared from larger denier filaments may be placed in the middle of it to provide the molded article with both smooth surface and high strength. Further, the molded articles reinforced with glass fiber can contain foamed materials in it to decrease the weight.

In the present invention, the metathesis polymerizable monomers are preferably cycloalkenes having 1 to 3 metathesis polymerizable cycloalkene moieties, especially having at least one norbornene moiety. Examples of them include dicyclopentadiene (DCPD), tricyclopentadiene, cyclopentadienemethylcyclopentadienecodimer, 5-ethylidenenorbornene, 5-vinylnorbornene, 5-phenylnorbornene, norbornene, 5-cyclohexenylnorbornene, 1,4-methano-1,4,4a,5,6,7,8,8a-octahydronaphthalene, 1,4,5,8-dimethano-1,4,4a,5,6,7,8,8a-octahydronaphthalene, 6-ethylidene-1,4,5,8-dimethano-1,4,4a,5,7,8,8a-heptahydronaphthalene, 1,4,5,8-dimethano-1,4,4a,5,7,8,8a-hexahydronaphthalene, ethylenebis(5-norbornene), tricyclo[8,2,1,0]trideca-5,11-diene, norbornadiene, and the like.

They can be used alone or in the form of a mixture of some of them. Dicyclopentadiene or a mixture of dicyclopentadiene with at least one other monomer is desirable.

In the present invention, there may also be used other metathesis polymerizable cyclic compounds having at least one hetero atom such as oxygen, nitrogen and the like together with metathesis polymerizable cycloalkene moiety, preferably norbornene moiety.

The hetero atom forms a polar group in the structure of said cyclic compounds, and those cyclic compounds having the polar group often can moderate the metathesis polymerization reaction.

Preferred examples of the polar groups include ether groups, carboxylic ester groups, cyano group, N-substituted imido groups, and the like.

Examples of cyclic compounds having the polar groups include [(5-norbornenyl-methyl]phenyl ether, bis[(5-norbornenyl)-methyl]ether, 5-methoxycarbonylnorbornene, 5-methoxycarbonyl-5-methynorbornene, 5-[(2-ethylhexyloxy)carbonyl]norbornene, ethylenebis(5-norbornenecarboxylate), 5-cyanonorbornene, 5-cyano-1,4,5,8-dimethano-1,4,4a,5,6,7,8,8a-octahydronaphthalene, N-butylnadic acid imide, 5-(4-pyridyl)-norbornene, and the like.

These cyclic compounds having polar groups are generally used with DCPD and the like. It is also preferable that these other cyclic compounds have less impurities which inhibit the metathesis polymerization.

In general, as well known, the metathesis polymerization catalyst system is composed of two components, i.e., a main catalyst component and an activator component.

The metathesis polymerization reaction is an exothermal reaction and proceeds very rapidly. Under such situation, the polymerization often occurs before the mixture can be poured into a mold, and it makes the pouring of the mixture into the mold difficult and makes the production of large sized molded articles difficult.

Accordingly, in the present invention, the catalyst and the activator of the metathesis polymerization catalyst system are added to individual monomer solutions to form a multi-part reactive solution (i.e., a multi-part metathesis polymerizable composition), and then the multi-part reactive solutions are mixed rapidly by means of a dynamic rotary mixer, and finally the mixture is immediately poured into a mold wherein it is polymerized and molded.

In this method, the multi-part reactive solutions do not need to have the same composition of monomers in each part. The composition of the monomers of each solution may be changed freely taking final composition of the monomers into consideration.

As the catalyst component of the metathesis polymerization catalyst system are used compounds, especially halides, of tungsten, molybdenum, rhenium or tantalum, preferably, tungsten, and molybdenum. Particularly preferable are tungsten compounds. Among tungsten compounds are preferred tungsten halides, tungsten oxyhalides and the like. Tungsten hexachloride and tungsten oxychloride are more preferred. Organoammonium tungstate and molybdate may also be used. However, such tungsten halide compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound.

A chelating agent or a Lewis base is preferably added to the solution containing the tungsten compound in order to prevent such undesirable polymerization as cationic polymerization. Those additives may include acetylacetone, acetoacetic acid, alkyl esters of acetoacetic acid, tetrahydrofuran, benzonitrile, and the like. About 1 to 5 moles of a chelating agent or a Lewis base is preferably used per one mole of the tungsten compound. Under such situations, the reactive solution containing the monomers and the catalyst component of the metathesis polymerization catalyst system (sometimes called "Solution A" hereinafter) is kept stable sufficiently for practical use.

The activator components of the metathesis polymerization catalyst system include organic metal compounds such as alkylated products of metals of Group I - Group III in the Periodic Table, preferably, tetraalkyl tins, trialkyl tin hydrides, alkylaluminum compound and alkylaluminum halide compounds including diethylaluminum chloride, ethylaluminum dichloride, trioctylaluminum, dioctylaluminum iodide, tetrabutyltin, and the like. The activator component is dissolved in a mixture of monomers to form the other reactive solution (sometimes called "Solution B" hereinafter).

According to the present invention, in principle, the molded articles are produced by mixing said two reactive solutions (i.e., Solution A and Solution B) as already described above. The polymerization reaction, however, starts so rapidly when the above-mentioned composition is used, and so the undesirable initiation of polymerization often accompanied by partial gelling occurs before completion of filling of the mixed solution into the mold. In order to overcome the problem, it is preferable to use a polymerization moderating agent.

As such moderators are generally used Lewis bases, particularly, ethers, esters, nitriles, and the like.

Examples of the moderators include ethylbenzoate, butyl ether, diglyme, diethyleneglycoldibutylether, benzonitrile, and the like. Such moderators are generally added to the reactive solution containing the activator component.

In this case, when a polar monomer which moderates the metathesis polymerization is used with DCPD and the like in the reactive solution containing the activator component, the Lewis base may also be omitted.

When a tungsten compound is used as the catalyst component, the ratio of the tungsten compound to the above-mentioned monomers is about 1000:1 to about 15000:1, and preferably about 2000:1 on molar base. When an alkylaluminum compound is used as the activator component, the ratio of the aluminum compound to the above-mentioned monomers is about 100:1 to about 3000:1, and preferably around a ratio of about 300:1 to about 1000:1 on molar base.

The amount of the masking agent or the moderator may be adjusted by experiments depending upon the amount of the catalyst system.

A variety of other additives may be used practically in the present invention together with the fillers to improve or to maintain characteristics of the molded articles. The additives include pigments, antioxidants, light stabilizers, macromolecular modifiers, flame retardants, and the like. These additives must be added to the starting solutions, since they cannot be added after the solutions are polymerized to the solid molded polymer.

The additives may be added to either one or both of multi-part reactive solutions. The additives must be ones being substantially unreactive with the highly reactive catalyst component and activator component of the metathesis polymerization catalyst system in the solutions to avoid troubles as well as inhibition of polymerization.

If a reaction between the additive and the catalyst system is unavoidable, but does not proceed so rapidly, the additives can be mixed with the monomers to prepare a third solution, and the third solution is mixed with the first and/or second solutions of the multi-part solutions immediately before pouring the mixture into a mold.

The molded articles of the invention may preferably contain an antioxidant. Phenol and amine antioxidants are suitable and they are added to the polymerizable solution previously, usually to Solution A. Examples of the antioxidants include 2,6-t-butyl-p-cresol, N,N'-diphenyl-p-phenylenediamine, tetrakis[methylene(3,5-di-t-butyl-4-hydroxycinnamate)]methane, methylene-4,4'-bis(3,5-di-t-butylphenol), and the like.

The molded articles of the invention may also contain other polymers which are added to the monomer solution. Among polymers, elastomers are more preferable, since they increase the impact strength of the molded articles and they effectively control the viscosity of the solution. Examples of the elastomers include styrene-butadiene rubber, polybutadiene, styrene-butadiene-styrene triblock rubber, styreneisoprene-styrene triblock rubber, polyisoprene, butyl rubber, ethylene-propylene rubber, ethylene-propylene-diene terpolymer, nitrile rubber, and the like.

In the present invention, further, there may be added a compound which reduces the amount of the unreacted residual monomers in the molded articles to avoid the unpleasant odor originating from the unreacted monomers. Examples of such compounds include $\alpha,\alpha,\alpha$-trichlorotoluene, esters of trichloro-acetic acid, phthalic chloride, benzoic anhydride, phosphorus oxychloride, benzensulfonic chloride, and the like.

As described above, the molded articles of the invention are preferably prepared by simultaneous molding with polymerizing, i.e., by RIM process or pre-mix process including RTM and RI process. In RIM process, two parts of the monomer solutions of the metathesis polymerization composition are rapidly mixed in the impingement mixing head of a RIM machine and the mixture is poured into a mold wherein it polymerizes and is molded.

In a pre-mix process, two-part monomer solutions containing the catalyst component and the activator component respectively are previously mixed to prepare a pre-mixture and then the pre-mixture is introduced into a mold. In the RIM and RTM process, when the fillers treated with the silanes are small or short sized ones such as milled glass and are added in the metathesis polymerizable composition, as mentioned above, the fillers are added in either of the reactive solutions or both of them.

In both the RIM process and pre-mix process, the mixture can be introduced into the mold under relatively low pressure so that an inexpensive mold is usable. The temperature inside the mold increases rapidly by heat of the polymerization reaction so that the polymerization reaction is completed in a short time. The molded article of the invention can be removed easily from the mold without a releasing agent, unlike the polyurethane-RIM process.

The surface of the molded articles has polarity probably by the oxidized layer formed on the surface so that conventional coatings such as epoxy, polyurethane and the like adhere to the surface well.

In the present invention, the fillers pretreated with the silanes have at least one hydrolyzable group bonded to silicon atom and at least one group of the formula $R^1$—CH=CH—$R^2$—, wherein $R^1$ and $R^2$ are the same groups as mentioned above respectively, which is bonded to silicon atom having very good affinity with the metathesis polymerizable composition and can improve the mechanical and physical properties of the molded articles prepared from the metathesis polymerizable composition more than the fillers treated with other commercially available silanes than those used in the present invention.

Thus, the molded articles of the present invention have high impact strength, tensile strength, flexural strength, dimensional stability, flexural modulus, heat distortion temperature and the like.

The present invention provides a variety of molded articles which include large sized molded articles such as parts of various vehicles including transports and machines such as motor cars, automobiles, motorbikes, motorboats, snowmobiles, tractors, golf carts, etc., housings of electric and electronic instruments, other articles used for sports or leisure sports and the like.

This invention described herein is illustrated by the following examples. These examples do not limit the invention.

EXAMPLE 1

(1) Preparation of ingredients

Commercially available dicyclopentadiene (DCPD) was purified by distillation under nitrogen reduced pressure to produce purified DCPD with a freezing point of 33.4° C. The purity was determined by gas chromatography to be not less than 99%.

There was used commercially available highly pure ethylidene norbornene (ENB) having purity above 99% determined by gas chromatography. Preparation of a concentrated catalyst component solution:

19.80 g (0.05 mole) of tungsten hexachloride was added to 90 ml of anhydrous toluene under nitrogen and then a solution consisting of 0.925 g of t-butanol and 5 ml of toluene was added. After the mixture was stirred for one hour, a solution consisting of 11.05 g (0.05 mole) of nonylphenol and 5 ml of toluene was added and then stirred for one hour under nitrogen. 10 g of acetylacetone was added and then the solution was purged with nitrogen overnight to remove hydrogen chloride gas formed by the reaction of tungsten hexachloride with nonylphenol. Toluene was added to the resulting solution to prepare a concentrated catalyst component solution containing 0.5M tungsten in terms of the metal content.

Preparation of a concentrated activator component solution 31.17 g of tri-n-octylaluminum, 5.70 g of di-n-octylaluminum iodide and 13.42 g of diglyme were mixed under nitrogen, and then DCPD was added to prepare a concentrated activator component solution containing 1.0M aluminum in terms of the metal content.

Preparation of a solution containing mixed monomers

DCPD and ENB were mixed in the weight ratio of 96.5:3.5 to prepare a mixed monomers solution.

Preparation of solution containing the catalyst component in a standard concentration 1000 g of the mixed monomers solution was introduced into a glass bottle provided with a salem cap. After the sufficient purge of nitrogen, 16.2 ml of the concentrated catalyst component solution was introduced into the bottle using a syringe, and then the mixture was stirred enough to prepare a solution containing 0.001M tungsten in the term of the metal content (Solution A).

Preparation of a solution containing the activator component in a standard concentration 1000 g of the mixed monomers solution was introduced into a glass bottle provided with a salem cap. After the sufficient purge of nitrogen, 23.7 ml of the concentrated activator component solution was introduced into the bottle by a syringe, and then the mixture was stirred enough to prepare a solution containing 0.003M aluminum in terms of metal content (Solution B).

Preparation of aqueous solutions or dispersions containing silane

Each of silanes recited in Table 1 below was dissolved or dispersed in water to prepare each of aqueous solutions or dispersions containing 1 wt. % of silane. pH of the aqueous solutions or dispersions was adjusted as shown in Table 1.

TABLE 1

| Aqueous Solution or Dispersion of Silane | Kinds of Silane | pH of Aqueous Solution or Dispersion |
| --- | --- | --- |
| a | vinyltriethoxysilane | 3.5 |
| b | allyltriethoxysilane | 3.5 |
| c | (γ-methacryloxy)propyl-trimethoxysilane | 4.0 |
| d | N-β-(N-vinylbenzylaminoethyl)-γ-aminopropyltrimethoxysilane-hydrochlorate | 7.0 |
| e | γ-aminopropyltriethoxysilane | 7.0 |
| f | γ-chloropropyltriethoxysilane | 4.5 |

(2) Tests of coupling effect of silanes and tests of influence of silanes on metathesis polymerization Treatment of inner surface of glass containers Each of the aqueous solutions and dispersions (a)–(f) prepared as above was applied on an inner surface of glass containers having a diameter of 5.5 cm and a depth of 10 cm in the amount of 0.1 g of the aqueous solutions or dispersion (a)–(f) per 700 cm$^2$ of the inner surface. The inner surface of the glass containers was dried at the temperature of 20° C. for 24 hours and then heated at the temperature of ° C. for 10 minutes.

Introduction of Solution A and Solution B into glass container

Solution A and Solution B prepared as above were introduced into each of two syringes respectively and maintained at 30° C.

From each of the two syringes, 10 ml of Solution A and 10 ml of Solution B were introduced into the glass container coated with each of the aqueous solutions and dispersions (a)–(f) as above and stirred enough to be mixed. After stirring, a thermocouple was inserted into the glass container and the time when the temperature of the mixture reached 100° C. after the introduction into the glass container was measured as "polymerization time". Results are shown in Table 2 below.

Further, the coupling effect of the silanes was tested by examining whether the polymers prepared in the glass containers are peeled off from the inner surface of the glass containers or not. The tests of the coupling effect of the silanes were carried out by hand-peeling off. The results are shown in Table 2.

As a comparison, the same procedures and tests as above were repeated except that the inner surface of the glass container was not treated with the aqueous solution and dispersions (a)–(f). The results are also shown in Table 2.

TABLE 2

| Aqueous Solution or Dispersion of Silane | Kinds of Silane | Polymerization Time (sec.) | Coupling Effect Test of Silane |
|---|---|---|---|
| a | vinyltriethoxysilane | 48 | not peeled off |
| b | allyltriethoxysilane | 42 | not peeled off |
| c | (γ-methacryloxy)-propyltrimethoxysilane | 55 | peeled off |
| d | N-β-(N-vinylbenzyl-aminoethyl)-γ-amino-propyltrimethoxysilane-hydrochloride | 62 | peeled off |
| e | γ-aminopropyltriethoxy-silane | 71 | peeled off |
| f | γ-chloropropyltriethoxy-silane | 53 | peeled off |
| not used | — | 35 | peeled off |

Though the aqueous solutions or dispersions containing each of the silanes were not applied on fillers, but applied on the inner surface of the glass containers, the results of Table 2 show that vinyltriethoxysilane and allyltriethoxysilane increase the affinity of the metathesis polymerized copolymer of DCPD and ENB with glass and bind strongly the copolymer with glass, while other silanes do not increase the affinity of the copolymer with glass.

The results of Table 2 also show that vinyltriethoxysilane and allyltriethoxysilane decrease the activity of the metathesis polymerization catalyst system less than other silanes.

EXAMPLE 2

Tests of coupling effect of silanes:

Each of the aqueous solutions and dispersions (a)–(f) in Table 1 was applied on a glass plate of 2 mm thick in the amount of 0.5 g of each of the aqueous solutions and dispersions (a)–(f) per 100 cm$^2$ of the glass plate. The glass plate was dried at 20° C. for 24 hours and then was heated at 120° C. for 10 mintues.

The glass plate coated with each silane was placed inside of a mold of a micro-RIM machine in such a manner that the silane-coated surface of the glass plate faced a methathesis polymerizable composition to be injected into the mold.

Solution A and Solution B prepared in Example 1 were introduced into two syringes respectively. 10 ml of Solution A and 10 ml of Solution B were injected from the two syringes into the mold under impingement mixing to produce each of plaques of DCPD/ENB copolymer.

There were obtained plaques to which surface the glass plate was bonded strongly when the glass plate coated with the aqueous solution (a) or (b) shown in Table 1 was put in the mold, though the glass plate was somewhat broken with the shrink of the plaques of DCPD/ENB copolymer.

On the other hand, the glass plate was not bonded to the surface of the plaque when the glass plate put in the mold was coated with each of the aqueous solutions and dispersions (c)–(f) or was not coated with the aqueous solutions and dispersions (a)–(f).

These results also show that silanes having a vinyl or allyl group bonded to silicon atom with hydrolyzable groups can increase the affinity of glass with the molded articles of the metathesis polymerized polymer.

EXAMPLE 3

Production of composite containing woven glass cloth:

Each of woven glass cloths (plain weave; 215 g/cm$^2$; 0.22 mm thick) was heated at the temperature of 350° C. for 60 hours to remove any coating or sizing on its surface. Then the woven glass cloth was dipped in each of the aqueous solutions and dispersions (a)–(f) in Table 1 and then taken out from the aqueous solution or dispersion. The excess aqueous solution or dispersion on each glass cloth was removed from the cloth by passing through between two squeezing rollers. Each cloth was dried at room temperature for 1 day and then heated at the temperature of 120° C. for 10 mintues. Ten sheets of the woven glass cloth prepared as above were piled up in a mold.

Solution A having the same composition as that prepared in Example 1, which further contained 2%, based on the weight of the monomers (i.e., DCPD and ENB), styrene-butadiene rubber available from Firestone Co. as SBR-Stereon 720 and Solution B having the same composition as that prepared in Example 1, which further contained 2%, based on the weight of the monomers of the same rubber as above were poured into two service tanks of a RIM machine, respectively.

Solution A and Solution B in the tanks were injected through the impingement-mixing head of the RIM machine into the mold to produce each of DCPD/ENB copolymer plate composites comprising piled-up woven glass cloths.

As a comparison, the same procedure as above was repeated except that the woven glass cloths not treated with the aqueous solutions and dispersions (a)–(f) in Table 1 were piled up in a mold.

The flexural strength and flexural modulus of each of the composite plates produced above were measured.

The results are shown in Table 3 below.

TABLE 3

| Kind of Aqueous Solution or Dispersion of Silane | Flexural Strength of Plate Composite (kg/cm$^2$) | Flexural Modulus of Plate Composite (kg/cm$^2$) |
| --- | --- | --- |
| a | 1700 | 83000 |
| b | 1800 | 85000 |
| c | 1290 | 61500 |
| d | 910 | 43500 |
| e | 1320 | 57500 |
| f | 1230 | 60500 |
| not used | 1370 | 68500 |

The results of Table 3 show that the plate composites of the present invention, in which the glass cloth reinforcements were treated with silane couplers having vinyl or allyl group bonded to silicon atom, have increased flexural strength and flexural modulus compared to the plate composite in which the glass cloth reinforcements were not treated with silane coupler, while the plate composites, in which the glass cloths were treated with other commonly used silane couplers as shown in Table 1, show rather less flexural strength and flexural modulus than the plate composite in which the glass cloths were not treated with any silane couplers.

What we claim is:

1. In a process for producing a molded article by introducing a metathesis polymerizable composition comprising at least one metathesis polymerizable monomer and a metathesis polymerization catalyst system into a mold in which the composition is metathesis polymerized to form the molded article, the improvement consisting essentially of polymerizing in the presence of at least one filler that has been treated with a coupling agent having the formula $$R^1-CH=CH-R^2-Si(R^3)_m(X)_{3-m}$$

wherein $R^1$ is a hydrogen atom or a 1–6 carbon alkyl group, $R^2$ is a single bond or a 1–6 carbon alkylene group, $R^3$ is a 1–6 carbon alkyl group, X is a hydrolyzable group selected from the group consisting of halogen, alkoxy and acyloxy groups optionally having other polar groups, and m is 0, 1 or 2.

2. The process of claim 1 in which the silane coupler has the formula $$R^1-CH=CH-R^2-Si(X)_3$$

wherein $R^1$ is a hydrogen atom or a 1–6 carbon alkyl group, $R^2$ is a single bond or a 1–6 carbon alkylene group and X is a hydrolyzable group selected from the group consisting of halogen, alkoxy and acyloxy groups optionally having other polar groups.

3. The process of claim 1 in which the filler is selected from the group consisting of glass, alumina, silica, metal titanates, wollastonite, mica, kaolin clay and talc.

4. The process of claim 1 in which the filler is an inorganic filler in the form of a woven, nonwoven or knitted fabric cloth; a fiber mat; a fiber preform; a powder; chopped fibers; microfibers; flakes or microballoons.

5. The process of claim 4 in which the filler is glass.

* * * * *

UNITED STATES PATENT AND TRADEMARK OFFICE
CERTIFICATE OF CORRECTION

PATENT NO. : 5,096,644

DATED : March 17, 1992

INVENTOR(S) : Zenichiro Endo; Shigeyoshi Hara; Paul A. Silver; and Hikoichiro Yamada It is certified that error appears in the above-identified patent and that said Letters Patent is hereby corrected as shown below:

Col. 11, line 4, "of °C." should read -- of 120°C. --; and

Col. 12, line 27, "to silicon" should read -- to a silicon --.

Signed and Sealed this

Twenty-ninth Day of June, 1993

Attest:

MICHAEL K. KIRK

*Attesting Officer*     *Acting Commissioner of Patents and Trademarks*